United States Patent [19]
Setaka et al.

[11] Patent Number: 5,778,997
[45] Date of Patent: Jul. 14, 1998

[54] METHOD AND DEVICE FOR CONTROLLING GENERATOR FOR HYBRID VEHICLE

[75] Inventors: Yousuke Setaka, Anjo; Keiichiro Banzai, Toyota, both of Japan

[73] Assignee: Nippondenso Co., Ltd., Kariya, Japan

[21] Appl. No.: 583,751

[22] Filed: Jan. 17, 1996

[30] Foreign Application Priority Data

Jan. 19, 1995 [JP] Japan ................................. 7-006765

[51] Int. Cl.$^6$ ................................. B60K 1/00
[52] U.S. Cl. ................................. 180/65.2; 180/65.4; 318/141
[58] Field of Search ................................. 180/65.1, 65.2, 180/65.3, 65.4, 65.6; 290/8, 9, 10, 11, 14, 16, 17, 45, 70; 318/139, 140, 141, 803, 142, 143

[56] References Cited

U.S. PATENT DOCUMENTS

| 5,402,046 | 3/1995 | Jeanneret | 180/65.4 |
| 5,515,937 | 5/1996 | Adler et al. | 180/65.4 |
| 5,566,774 | 10/1996 | Yoshida | 180/65.4 |
| 5,632,352 | 5/1997 | Jenneret et al. | 180/65.4 |

FOREIGN PATENT DOCUMENTS

| 62-64201 | 3/1987 | Japan. |
| 6-296302 | 10/1994 | Japan. |

*Primary Examiner*—Richard M. Camby
*Attorney, Agent, or Firm*—Cushman Darby & Cushman IP Group of Pillsbury Madison & Sutro LLP

[57] ABSTRACT

A generator is controlled by a controller to generate power sufficient to a battery quickly in addition to power which is required by a wheel-drive motor for a while after a car is started and until a battery charging ratio becomes higher than a first predetermined ratio, between 80% and 100% for example. When the battery charging ratio becomes higher than the first predetermined ratio, the generator is controlled to generate a regulated power which is obtained by adding a constant power to the mean value of the power required by the wheel-drive motor to prevent the battery from generating gases due to overcharging. When the battery-charging ratio further increases and becomes higher than a second predetermined ratio, 120% for example, the generator is controlled to generate less power than the requirement of the wheel-drive-motor.

12 Claims, 7 Drawing Sheets

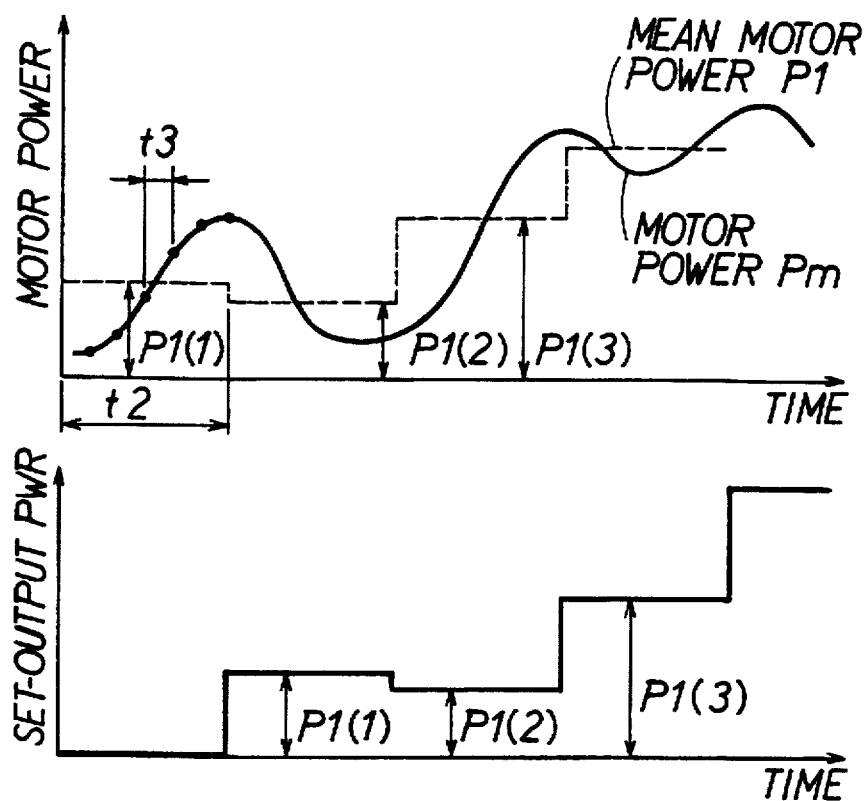
FIG. 5A
FIG. 5B
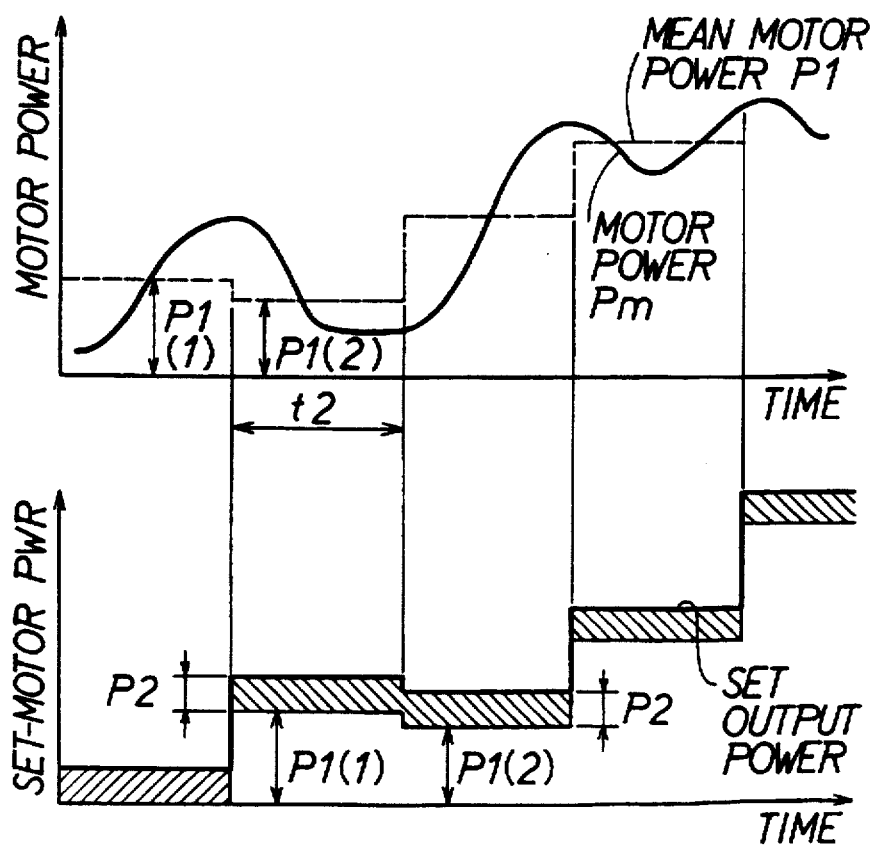
FIG. 6A
FIG. 6B

METHOD AND DEVICE FOR CONTROLLING GENERATOR FOR HYBRID VEHICLE

CROSS REFERENCE TO RELATED APPLICATION

The present application is based on and claims priority from Japanese Patent Application Hei 7-6765, filed on Jan. 19, 1995, the contents of which are incorporated herein by reference.

BACKGROUND OF THE INVENTION

1. Field of the Invention

The present invention relates to a method and a device for controlling a generator for a series-hybrid vehicle which has an electric motor powered by a battery or a set of batteries and is controlled according to an accelerator operation.

2. Description of Related Art

Electric cars have been developed to eliminate exhaust gases emitted from vehicles driven by the internal combustion engine. However, because the travel mileage of the electric car for each battery charging is limited by the energy density of the battery, a series-hybrid car has been proposed, for example, as disclosed in Japanese Patent Unexamined Publication Sho 62-64201. The series-hybrid car is provided with an AC generator driven by an internal combustion engine and a rectifying unit so that the electric power is stored in the battery and supplied from the battery to the motor through an inverter.

The generator of the series-hybrid car is controlled to change the output power according to motor load condition and battery charging state so as to maintain an optimum battery condition to enhance the battery charging and discharging efficiency and to regenerate electric power from the motor. For that purpose, the battery charging ratio (or state of charge) is controlled to be between 50% and 80%.

However, since the electric source for the electric car is composed of a set of batteries or assembled battery, the charging state of each of the batteries changes from each other as time goes on, resulting in deterioration of the battery and shortening of the battery life. It is, therefore, necessary to park the electric car for regulated charging of the battery (equalizing charge). That is, an extra battery charging device is necessary even though the electric car is equipped with a battery charging system, and frequent parking is required to charge the battery. A complicated battery charging facility and system also are necessary, thereby increasing the overall cost of the electric car.

Japanese unexamined Patent Publication Hei 6-296302 discloses an engine-driven generator which charges the battery at an interval measured by a timer. When the generator charges the battery while it is not fully charged, the voltage limit of the battery charging voltage is widened. As a result, the battery charging current changes over a wide range according to the vehicle running condition. Accordingly, if the battery charging state becomes close to the fully-charged state, the charging efficiency decreases. In addition, since the generator output power changes over a wide range as the battery charging current also changes over a wide range, engine torque changes and thereby affects various control devices.

SUMMARY OF THE INVENTION

In view of the above described circumstances, it is a primary object of the present invention to provide an improved method and device for controlling a generator for a series-hybrid car.

Another object of the present invention is to provide a method for controlling a generator for a series-hybrid car in which an engine driven-generator generates more output power than is required by the wheel-drive-motor to charge a battery quickly when a charging ratio of the battery is low and generates output power to charge the battery with regulated power (equalized power) which is given by adding a fixed power to the power required by the wheel-drive-motor when the charging state becomes higher than a first predetermined level.

The generator less may be controlled to generate output power than the wheel-drive-motor-power when the charging state becomes higher than a second predetermined level, thereafter.

The battery charging may be held for a predetermined time or until the series-hybrid car has run a predetermined travel distance after the generator is started.

Another object of the present invention is to provide a method for controlling a generator in which a plurality of data of the drive-motor-power are sampled in a fixed time, an arithmetical mean value of the plurality of data is calculated and a fixed power is added to the mean value to obtain power to charge the battery.

A further object of the present invention is to provide a device for controlling a generator for a series-hybrid car which is composed of a battery-current sensor, a generator-current sensor, a battery-voltage sensor, a wheel-drive-motor-power detecting unit, a first charging control unit for controlling the generator to generate output power sufficient to charge the battery quickly in addition to power required by the wheel-drive-motor when a battery charging ratio is at a low level, and a second charging control unit for controlling the generator to generate less output power less than is required by the wheel-drive-motor so as to discharge the battery when the battery charging ratio reaches a maximum level.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 5A and FIG. 5B are graphs showing a relationship between power required by a wheel-drive motor and the set output power of the generator in the generation mode;

FIGS. 6A and FIG. 6B are graphs showing the relationship between the power required by the wheel-drive motor and the set output power of the generator in a regulated charging mode;

DETAILED DESCRIPTION OF THE PREFERRED EMBODIMENT

Preferred embodiments will be described with reference to the appended drawings hereafter.

Figure 1:
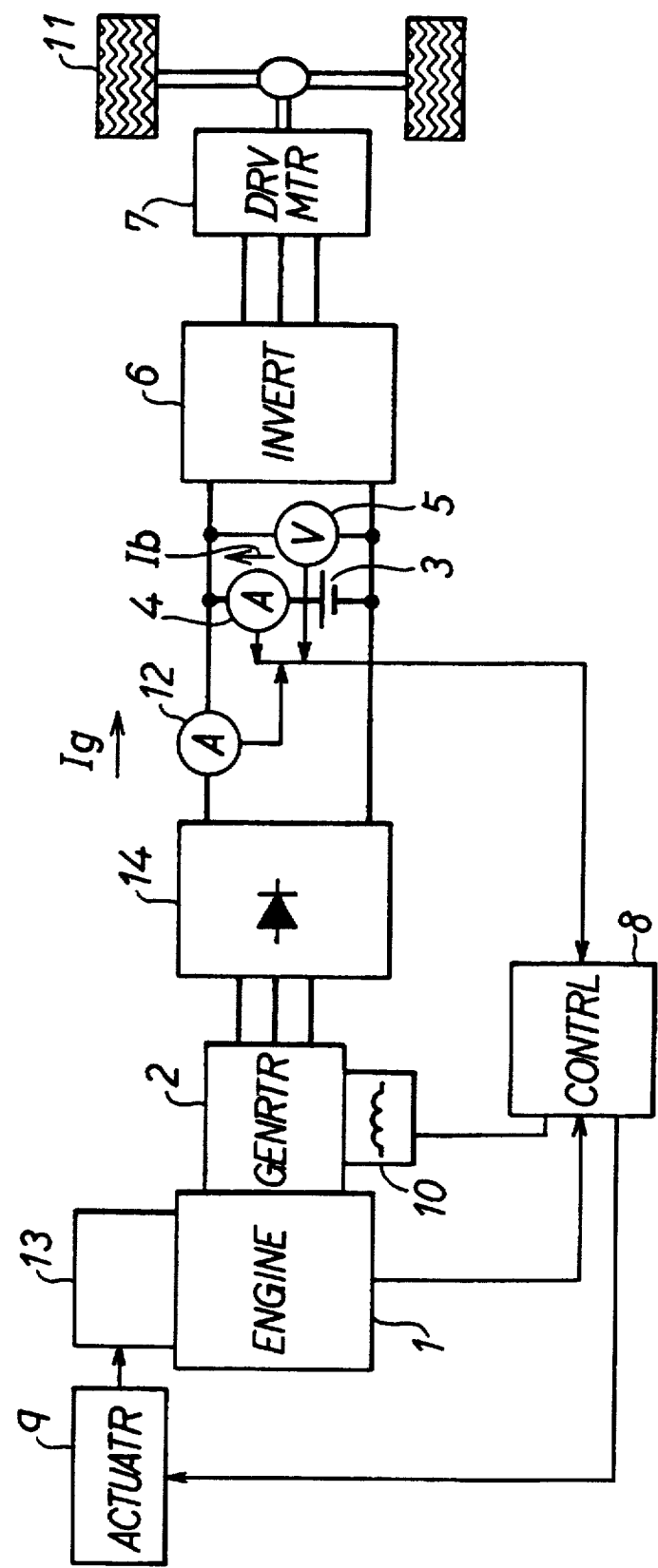
FIG. 1 is a block diagram showing an overall structure of a series hybrid car.

A series-hybrid car having an engine driven generator and a control device according to an embodiment of the present invention is described with reference to FIG. 1.

An output shaft of an internal combustion engine 1 is connected to a rotor (not shown) of a generator 2. A throttle valve 13 and a throttle actuator 9 which moves the throttle valve 13 to a set angle are connected to the engine 1.

The generator 2 is of a type generally referred to as an alternator which has a stator coil (not shown) connected to a rectifying circuit 14 and an exciting coil 10 connected to a controller 8. The rectifying unit 14 is connected to an assembled battery 3 composed of a set of batteries and an inverter 6 and rectifies the output current of the generator 1 to supply DC current to the battery 3, the inverter 6 and a wheel-drive motor 7 which is connected to the inverter 6.

The inverter 6 is a well-known type which is composed of a plurality of transistors (not shown) and diodes (not shown) and is connected to the battery 3. The drive motor 7 is connected to driving wheels 11 of the vehicle and energized by the inverter 6.

A battery voltage sensor 5 and battery current sensor 4 and an output current sensor 12 are respectively connected to the battery 3.

Figure 7:
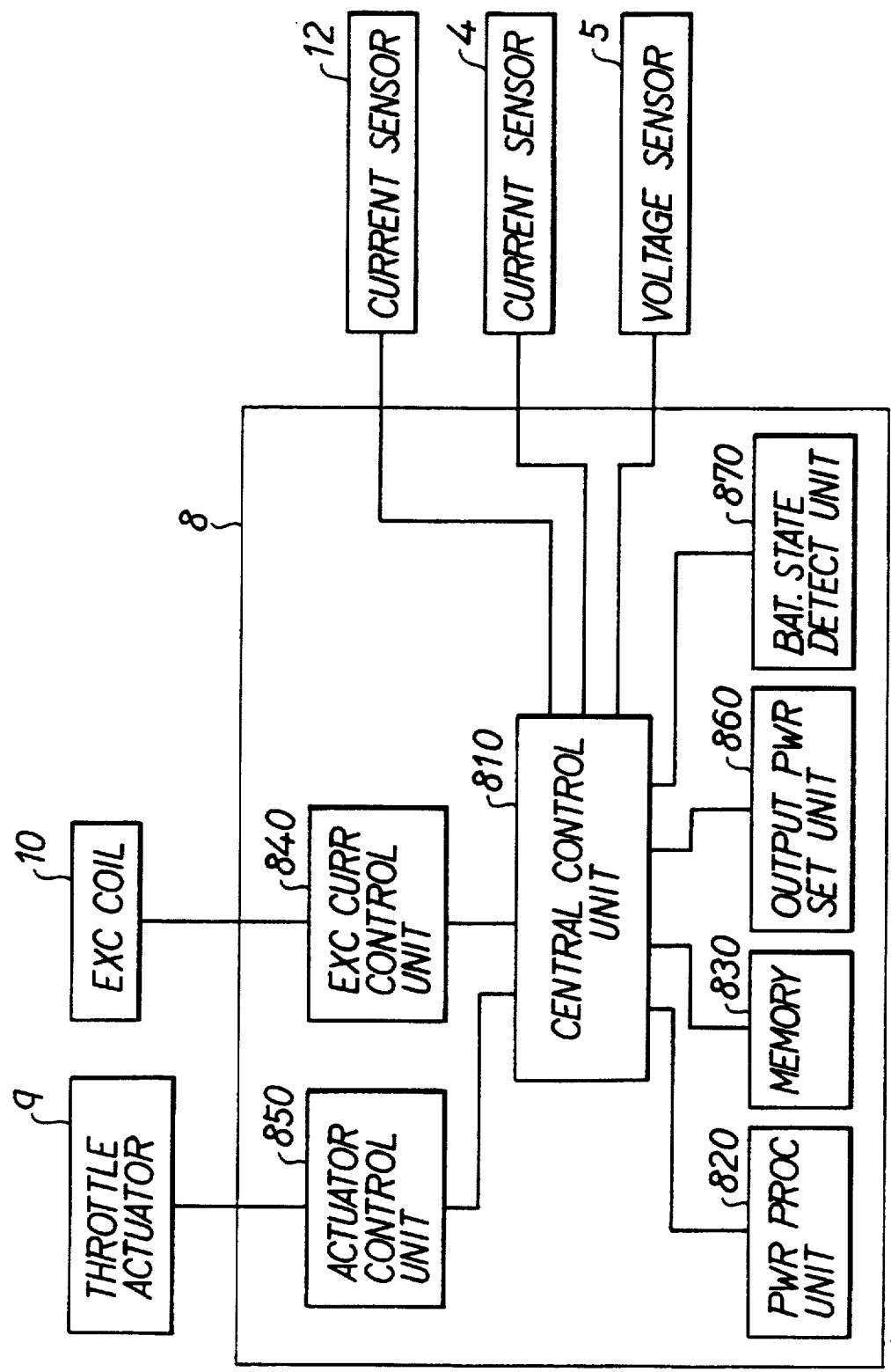
FIG. 7 is a block diagram showing a main portion of a controller.

The controller 8, as shown in FIG. 7, includes a central control unit 810, a power (or load) processing unit 820, a memory 830, an exciting current control unit 840, a throttle actuator driving unit 850, an output power setting unit 860 and a battery condition detecting unit 870. The controller 8 controls the exciting current supplied to the exciting coil 10 via the exciting current control unit 840 and controls the open angle of the throttle valve 13 via the throttle actuator driving unit 850 according to a battery charging state calculated by the battery state detecting unit 870, thereby controlling the generator output power and the engine operation.

Operation of the device according to the embodiment of the present invention is described with reference to FIG. 2 through FIG. 8.

Figure 2:
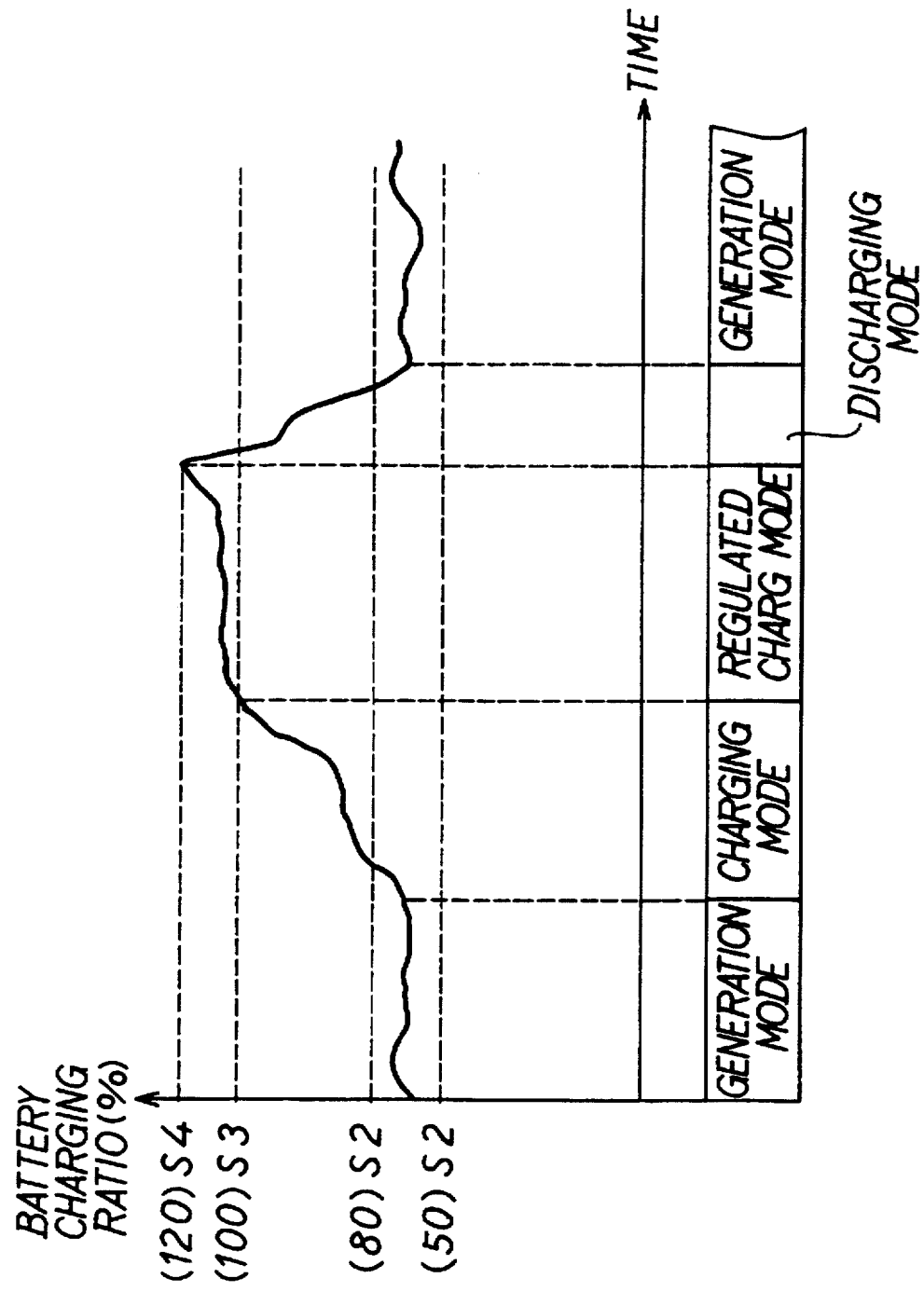
FIG. 2 is a graph showing battery charging state.

Output power of the generator 2 is controlled by the controller 8 in the following four modes shown in FIG. 2: (1) generation mode, (2) charging mode, (3) regulated charging mode and (4) discharging mode.

Figure 3:
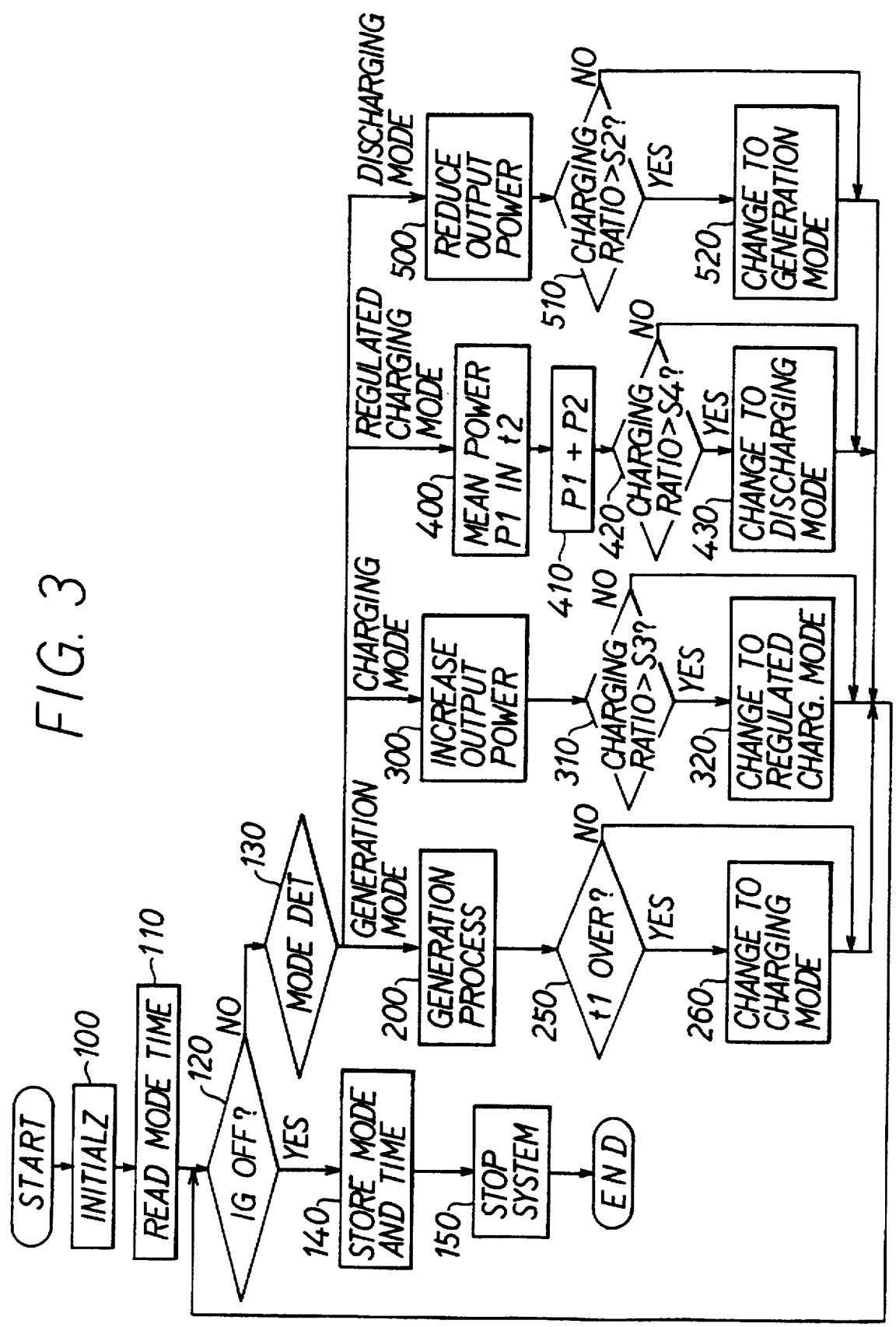
FIG. 3 is a flow chart of a method for controlling a generator according to an embodiment of the present invention.

In FIG. 3, the controller 8 initializes various data and set values stored in the memory 830 at the first step 100. Then, one of the modes of the generator 2 and a duration period of the mode of the last time until an ignition switch (hereinafter referred to as IG) was turned off is read out of the memory 830 in the following step 110.

Then, whether IG is turned off (hereinafter referred to as OFF) or not is checked in a step 120, and the process goes to a step 130 if IG is turned on (hereinafter referred to as ON) to determine which one of the modes is applied to control the generator 2. If the IG is OFF on the other hand, the process goes to a step 140 and a step 150 to stop operation of the system as described later.

The above four modes are as follows.

(1) Generation Mode

Figure 4:
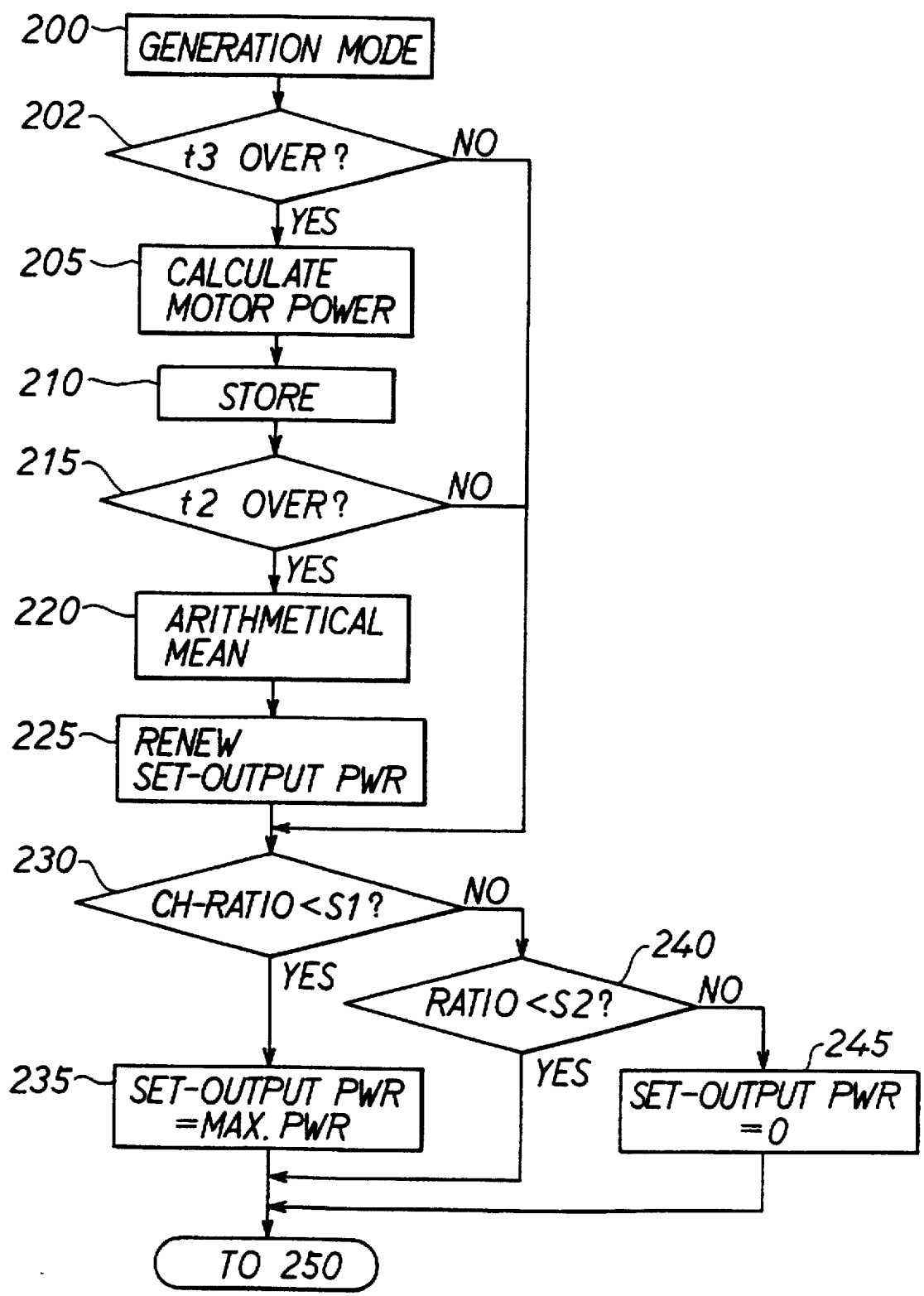
FIG. 4 is a flow chart of generator control in a generation mode.
Figure 8:
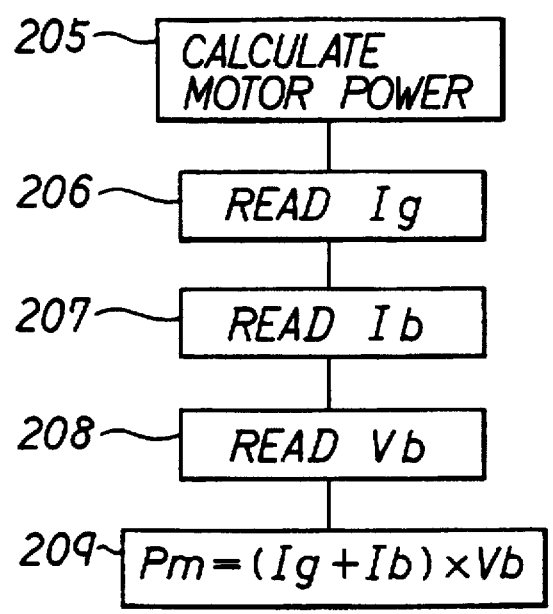
FIG. 8 is a flow chart for calculation of the power required by the wheel-drive motor.

When the generation mode is determined in the step 130, the process goes to a step 200, where a generation mode process is executed as shown in FIG. 4. A sampling time t3 is measured in a step 202, and the battery charging state is checked in the next step 230 if t3 is not over. If t3 is over, the process goes to a step 205, where motor power is calculated as shown in FIG. 8. Generator output current Ig is, thereafter, detected by the output current sensor 12 in a step 206, and battery current Ib is detected by the battery current sensor 4 in a step 207. Battery voltage Vb is subsequently detected by the battery voltage sensor 5 in a step 208, and a motor power Pm required by the drive motor 7 is calculated by the power processing unit 820 in a step 209 on the basis of the following equation.

$$Pm = (Ig+) \times Vb \qquad \text{Eq. 1}$$

The above value of the motor power Pm is stored into the memory 830 in a step 210 shown in FIG. 4. A set time t2 for renewing a set-output-power of the generator 2 is measured in a step 215, and the process goes to a step 220 if the set time t2 is over. On the other hand, the process goes to a step 230 without renewing the set-output-power if t2 is not over. In the step 220, an arithmetical mean pi of data of the motor power (hereinafter referred to as mean motor power) which are calculated and stored each sampling time t3 during the set time t2 is calculated. A set-output-power is calculated by the output power setting unit 860 on the basis of the mean motor power Pi and is stored into the memory 830 as a next set-output-power for the next set time t2. The relationships between time and the motor power and the arithmetical mean of the motor power, and between time and the set-output-power of the generator 2 are shown in FIGS. 5A and 5B.

A battery charging ratio which represents the battery charging state is detected by the battery voltage sensor 5 and the battery current sensor 4 and is checked by the battery condition detecting unit 870 in a step 230. If a battery charging ratio to the full charge state (a ratio of 100%) is smaller than a ratio S1 (for example, 50%), the process goes to a step 235, where the generator 2 is controlled so that the charging ratio of the battery 3 becomes higher than S1. If the battery charging ratio is higher than S1 and lower than S2 (for example, 80%), the process goes to a step 240, where the set-output-power calculated in the step 225 is maintained as it is before. If the battery charging ratio is higher than S2 on the other hand, the set-output-power is changed to 0, that is, generation is stopped, and the process returns to a step 250 of the main routine shown in FIG. 3. In other words, the charging ratio is controlled to be in a range between S1 (50%, for example) and S2 (80%, for example) labeled as generation mode in FIG. 2.

In the step 250, a time period t1 for the generation mode is measured. If the time period t1 is not over, the process returns to the step 120 again. If the time period t1 is over, the process goes to a step 260, where the mode is changed to the charging mode, and the process returns to the step 120.

(2) Charging Mode

If the charging mode is determined in the step 130, the set-output-power is set by the output power setting unit 860 to be larger than power required by the wheel-drive motor 7 in a step 300 to control the generator 2. That is, the battery 3 is charged with marginal power corresponding to the difference of power between the power required by the wheel-drive motor 7 and the set-output-power of the generator 2 with the result that the battery charging ratio increases quickly. The battery charging ratio is checked by the battery state detecting unit 870 in the same manner as the generation mode in a step 310. If the battery charging ratio is lower than S3 (for example, 100%), the process returns to the step 120. On the other hand, the process goes to a step 320 if the battery charging ratio becomes S3, and the mode is changed to the regulated charging mode, and the process returns to the step 120. That is, the set-output-power is made larger than the motor power so that the battery is charged until the battery charging ratio becomes S3 in the charging mode. The set-output-power and the motor power are calculated in the same manner as in the generation mode.

(3) Regulated Charging Mode

If the regulated charging mode is determined in the step 130, the process goes to a step 400, where an arithmetical mean (mean motor power) P1 of the motor power sampled during the set time t2 is calculated by the power processing unit 820 in the same manner as in the generation mode. Then, a predetermined power P2 is added to the mean motor power P1, which was stored in the memory 830 last time, by the output power setting unit 860 to obtain a new set-output-power. FIGS. 6A and 6B show setting of the next set-output-power which is calculated by adding the predetermined power P2 to the mean motor power P1(1) and P1 (2). Each mean motor power is calculated during each set time t2.

The predetermined power P2 is determined so that gases generated while the battery 3 is charged can be absorbed by electrolyte of the battery 3. For example, the power P2 is between 2 A and 3 A in case of a battery having a capacity of 40 Ah.

As a result, an assembled battery charged according to the above method can be prevented from electrolyzing the battery solution, thereby maintaining high efficiency and a long life for the battery. In addition, since the battery is charged with a regulated current, torque changes in the generator 2 are limited so that a constant engine speed can be maintained.

If the battery charging ratio becomes larger than S4 (for example 120%), the process goes to a step 430, where the mode is changed to the discharging mode.

(4) Discharging Mode

If the discharging mode is determined in the step 130, the process goes to a step 500, where the set-output-power is controlled by the output power setting unit 860 to be less than the power required by the wheel-drive motor 7. As a result, the battery charging ratio is gradually reduced by the power consumed in the drive motor 7. Then, the battery charging state is checked in a step 510. If the battery charging ratio becomes less than S2, the process goes to a step 520, where the mode is changed to the generation mode and the process returns to the step 120. If, on the other hand, the battery charging ratio does not become less than S2, the process goes to the step 120 directly.

If the IG is OFF, the process goes to the step 140 from the step 120, where the present mode and time period of the mode are stored into the memory 830 and the process goes to the step 150 to stop control of the system.

The time period of this embodiment may be replaced with travel distance in which the regulated charge is carried out.

Threshold values S1, S2, S3 and S4 may be replaced with values other than 50%, 80%, 100% and 120% selected according to the battery capacity, type or some other factors. According to the present invention, since the assembled battery is charged with a regulated power while the vehicle is running, the life of the assembled battery, which is composed of a set of batteries having a variety of charging conditions, can be maintained without deterioration. As a result, frequent stops for battery charging are not necessary, thereby simplifying the charging facility and preventing cost increases.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for controlling a generator for a series-hybrid car including an engine-driven generator, an assembled battery, and a wheel-drive motor energized by said generator and said battery, said method comprising the steps of:

detecting current wheel-drive-motor power;

memorizing said current wheel-drive-motor power once in a set time;

detecting battery charging state; and controlling said generator to generate output power in accordance with said battery charging state, wherein said step of controlling said generator comprises a first step of controlling said generator to generate maximum output power if said charging state of said battery is lower than a first level; and when said charging state becomes higher than said first level, a second step of controlling said generator to generate output power which is a sum of a fixed power and said current wheel-drive-motor power memorized during said step of memorizing.

2. A method for controlling a generator as claimed in claim 1 wherein said step of controlling said generator further comprises a third step of controlling said generator to generate less output power than said wheel-drive-motor power which is memorized during said step of memorizing, when said charging state becomes higher than a second level.

3. A method for controlling a generator as claimed in claim 1 or claim 2 further comprising a step of holding said step of controlling said generator for a predetermined time after said generator is started.

4. A method for controlling a generator as claimed in claim 1 or claim 2 further comprising a step of holding said step of controlling said generator for a predetermined travel distance of said car after said generator is started.

5. A method for controlling a generator for a series-hybrid car including an engine-driven generator, a battery, wheel-drive motor energized by said generator and said battery, a battery-current sensor, a generator-current sensor, a battery-voltage sensor and a wheel-drive-motor power detecting unit, said method comprising:

a first step of controlling said generator to generate more output power than said wheel-drive-motor power to charge said battery when said charging state of said battery is under a first level; and a second step of controlling said generator to generate output power to charge said battery with regulated power which is given by adding a fixed power to a previously detected value of said wheel-drive-motor power when said charging state becomes higher than said first level, wherein said second step comprises:

a step of sampling a plurality of data of said wheel-drive motor power in a fixed time;

a step of calculating an arithmetical mean value of said plurality of data; and a step of adding said fixed power to said arithmetical mean value.

6. A device for controlling a generator for a series-hybrid car including an engine-driven generator, a battery connected to said generator, and a wheel-drive motor energized by said generator and said battery, said device comprising:

a power detecting unit for detecting motor power;

a memory for storing a current motor power once in a set time;

a battery charge detecting unit for detecting a charging ratio of said battery;

a first charging control unit for controlling said generator to generate maximum output power when said charging ratio is lower than a first level; and a second charging control unit for controlling said generator to generate regulated output power which is a sum of a fixed power and said current motor power when said charging ratio is higher than said first level.

7. A device for controlling a generator as claimed in claim 6, wherein said first charging control unit comprises means for holding battery charge for a fixed time period after said generator is turned on.

8. A device for controlling a generator as claimed in claim 6, wherein said first charging control unit comprises means for holding battery charge for a fixed travel distance of said car after said generator is turned on.

9. A device for controlling a generator for a series-hybrid car including an engine-driven generator, a battery connected to said generator, and a wheel-drive motor energized by said generator and said battery, said device comprising:

a power detecting unit for periodically detecting motor power;

a circuit providing an arithmetical mean value of said motor power which is periodically detected in a preceding period;

a battery charge detecting unit for detecting a charging ratio of said battery;

first means for controlling said generator to generate maximum output power to charge said battery when said charging ratio is lower than a first level between 50% and 80%; and second means for controlling said generator to generate regulated output power which is a sum of a fixed value and said arithmetical mean value when said charging ratio is higher than said first level.

10. A device for controlling a generator as claimed in claim 9, wherein said first charging control unit comprises means for holding battery charge for a fixed time period after said generator is turned on.

11. A device for controlling a generator as claimed in claim 9, wherein said first charging control unit comprises means for holding battery charge for a fixed travel distance of said car after said generator is turned on.

12. A device for controlling a generator as claimed in claim 9 further comprising a third means for controlling said generator to generate less output power than said arithmetical mean value when said charging ratio becomes higher than a second level between 100% and 120%.

* * * * *